Patented Aug. 8, 1933

1,922,006

UNITED STATES PATENT OFFICE

1,922,006

METHOD OF MAKING COLLOIDAL SOLUTIONS OF INORGANIC SUBSTANCES IN POLYALCOHOLS

Carl Hermann von Hoessle, Radebeul near Dresden, Germany, assignor to Chemische Fabrik Von Heyden, A. G., Radebeul near Dresden, Germany, a Corporation of Germany No Drawing. Application August 12, 1930, Serial No. 474,886, and in Germany January 10, 1930

16 Claims. (Cl. 252—6)

This invention relates to a process or method of making colloidal solutions of inorganic substances, such as metals, metallic compounds, metalloids, and it particularly relates to a method of making such colloidal solutions in polyalcohols, the object of the invention being to provide colloidal solutions of inorganic substances, such as referred to above, which are free of any objectionable effects accompanying their application.

It is another object of the invention to produce colloidal solutions of inorganic substances, such as metals, metallic compounds and metalloids, which, owing to their great stability, are applicable for medicinal as well as for technical purposes.

It is also an object of the invention to produce colloidal solutions of inorganic substances, such as metals, metallic compounds and metalloids, in substances which are soluble in solvents mostly met with in everyday life, i. e. water and alcohol, whereby the field of their application is considerably increased.

In my co-pending application #255 filed on the same day, under Serial No. 479,103, said application being entitled " Process for making colloidal solutions of metals, metallic compounds and metalloids in polyalcohols and products obtained thereby ", I have described a process for making of colloidal solutions of metals, metallic compounds and metalloids in polyalcohols, for instance such as glycerin, in which the respective colloidal substances were formed in the applied polyalcohol itself.

I have found, however, that occasionally in this method, described in my senior application referred to above, difficulties arise in the removal of impurities formed during the reaction.

I have now found that these shortcomings are avoided if I start the process by first producing in the well known way colloidal substances soluble in water, or other solvents, which evaporate relatively easily, and if I mix colloidal solutions produced in this way with glycerin and remove then the solvent from the mixture.

It could not be anticipated a priori that by this method stable colloidal solutions of metals, metallic compounds and metalloids in polyalcohols could be obtained. The proportions, in which the various materials are combined with each other, may be varied within a very wide range.

The new process is furthermore of advantage insofar that the hydrosols to be applied need not be first reduced to the dry state, which part is extremely important because it is well known that many colloidal substances are rendered partially, or entirely, insoluble by being reduced to the dry state. Of the polyalcohols, coming in consideration for the operation of my new method, I prefer particularly glycol, glycerin and the like, or derivatives of such polyalcohols in which their pollyalcohol character is not destroyed, or emulsions containing such polyalcohols.

For the better understanding of my new process I am going to describe how I proceed in its operation, citing glycerin by way of example as a representative of the said polyalcohols.

Example 1

10 parts of a colloidal metal, such as bismuth, or colloidal copper, or colloidal silver, are reduced in any of the well known ways, and are mixed with 20 parts water and 100 parts glycerin, whereupon the mixture of these substances is well agitated; the solution, thus obtained, is then put on the water bath and while being agitated the water is evaporated.

One obtains in this manner a colloidal solution of bismuth, copper, or silver in glycerin, according to what metal has been applied.

Example 2

Colloidal solutions of silver oxide, or copper oxide, are obtained by first acting on the solution of the respective metal salt with an alkali metal hydroxide in the presence of decomposition products of albumen, thereupon purifying the metal hydroxide by dialysis, admixing glycerin to the colloidal solution and then evaporating the water from the same.

Example 3

I suspend freshly precipitated and washed copper oxide, or mercury oxide, or silver oxide, or bismuth oxide, or lead oxide, or zinc oxide in the aqueous solution of a protective colloid and produce a colloidal solution of the respective metal sulfide in any well known way, by for instance passing hydrogen sulfide through the solution.

I mix then this solution with glycerin and distil off the water, eventually in vacuo.

I thus obtain the respective solution of the metal sulfides in glycerin.

Example 4

A solution of colloidal calomel, produced in the well known ways, is mixed with glycerin, whereupon the water is evaporated from the solution. I thus obtain a very stable colloidal solution of grey-white color.

Example 5

I produce a colloidal solution of a silver salt, such as silver iodide, or silver bromide, or silver chloride, or silver chromate in the well known way by forming these substances in water in the presence of a protective colloid; the purified solution is mixed with glycerin and the water is then evaporated from the said solution.

Example 6

20 parts glycerin are heated on the water bath in a flat dish and gradually 200 parts of a 2% colloidal silicic acid solution are introduced into the glycerin, while the mixture is well agitated. Upon the evaporation of the water one obtains a clear transparent, highly viscous mass of colloidal silicic acid in glycerin. The obtained product promises, according to various tests, great advantages in its application for therapeutical purposes.

Example 7

Sulfur flowers are heated with sodium hydroxide and to the solution thus obtained I add protective colloids, for instance such as decomposition products of albumen, sodium-lignosulphonate, gum-arabic and the like and precipitate the sulfur from the solution by acids. I wash then repeatedly with water and dissolve the sulfur by the addition of alkali metal hydroxides whereby a colloidal solution of sulfur is formed, which is then mixed with glycerin from which mixture, or solution, the water is then evaporated. I thus obtain an exceedingly stable colloidal solution of sulfur in glycerin. Inasmuch as it is known that it is difficult to bring the sulfur into a stable colloidal form, the value of this new process is self-evident.

What I claim is:

1. The method of making colloidal solutions of inorganic substances in a polyalcohol, said method consisting in first producing a solution of the colloidal form of the inorganic substance in an aqueous solvent, admixing the polyalcohol to aforesaid colloidal solution, and evaporating the water from the solution.

2. The method of making colloidal solutions of inorganic substances in a polyalcohol, said method consisting in first producing a solution of the colloidal form of the inorganic substance in an aqueous solvent, admixing glycerin to aforesaid solution, and evaporating the solvent from the solution.

3. The method of making colloidal solutions of inorganic substances in a polyalcohol, said method consisting in first producing a solution of the colloidal form of the inorganic substance and of a protective colloid in water, admixing the polyalcohol to the hydrosol, and evaporating the water from the colloidal solution.

4. The method of making colloidal solutions of inorganic substances in a polyalcohol, said method consisting in first producing a solution of the colloidal form of the inorganic substance and of a protective colloid in water, purifying the hydrosol, admixing the polyalcohol to the purified hydrosol, and evaporating the water from the colloidal solution.

5. The method of making a colloidal solution of inorganic substances in glycerin, said method consisting in first producing the hydrosol of the inorganic substance, in the presence of a protective colloid, being a de-composition product of albumen, admixing glycerin to the purified hydrosol, and evaporating the water from the colloidal solution.

6. The method of making a colloidal solution of a metal in a polyalcohol, said method consisting in dissolving a colloidal metal, prepared in any known way, in water, adding a polyalcohol to aforesaid colloidal solution and evaporating the water from the mixture.

7. The method of making a colloidal solution of a metal in glycerin, said method consisting in dissolving a colloidal metal, prepared in any known way, in water, adding glycerin to the aforesaid colloidal solution, and evaporating the water from the mixture.

8. The method of making a colloidal solution of a metal compound in a glycerin, said method consisting in forming a solution of the said colloidal metal compound in the aqueous solution of a protective colloid, adding glycerin to the aforesaid colloidal solution, and evaporating the water from the mixture.

9. The method of making a colloidal solution of a metal compound in a polyalcohol, said method consisting in forming a solution of the said colloid metal compound in the aqueous solution of a protective colloid, adding the polyalcohol to the aforesaid colloidal solution, and evaporating the water from the mixture.

10. The method of making a colloidal solution of a metal compound in a polyalcohol, said method consisting in forming the said colloidal compound from a solution of a corresponding metal salt in the presence of a protective colloid, adding a polyalcohol to the purified colloidal solution, and evaporating the water from the mixture.

11. The method of making a colloidal solution of a metal compound in glycerin, said method consisting in forming the said colloidal compound from a solution of a corresponding metal salt in the presence of a protective colloid, adding the glycerin to the purified colloidal solution, and evaporating the water from the mixture.

12. The method of making a colloidal solution of a metal compound in a polyalcohol, said method consisting in forming the said colloidal compound by acting with a gaseous precipitant on the suspension of an insoluble metal compound in water in the presence of a protective colloid, adding a polyalcohol, and evaporating the water from the mixture.

13. The method of making a colloidal solution of a metal compound in glycerin, said method consisting in forming the said colloidal compound by acting with a gaseous precipitant on the suspension of an insoluble metal compound in water in the presence of a protective colloid, adding glycerin, and evaporating the water from the mixture.

14. The method of making a colloidal solution of sulfur, said method consisting in first preparing a solution of sulfur by acting on the same at an elevated temperature with an aqueous solution of sodiumhydroxide, adding to the solution thus obtained a protective colloid, precipitating the sulfur from the mixture by acid, dissolving the precipitated sulfur in an aqueous solution of alkali metal hydroxide, adding the glycerin, and evaporating the water from the said mixture.

15. The method of making a colloidal solution of silicic acid in a polyalcohol, said method consisting in first preparing a colloidal solution of silicic acid in water, adding a polyalcohol and evaporating the water.

16. The method of making a colloidal solution of silicic acid in glycerin, said method consisting in first preparing a colloidal solution of silicic acid in water, adding the glycerin and evaporating the water.

CARL HERMANN von HOESSLE.